March 25, 1958     W. H. BURKE     2,827,802
FLUID DIFFERENTIAL
Filed Jan. 3, 1956     3 Sheets-Sheet 1
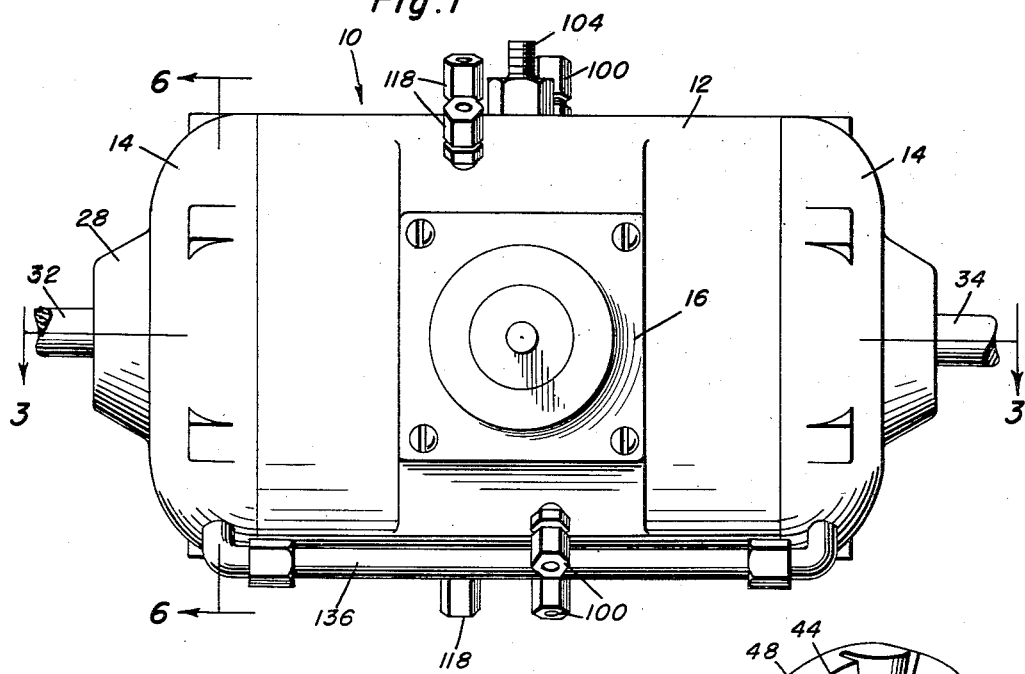
Fig. 1
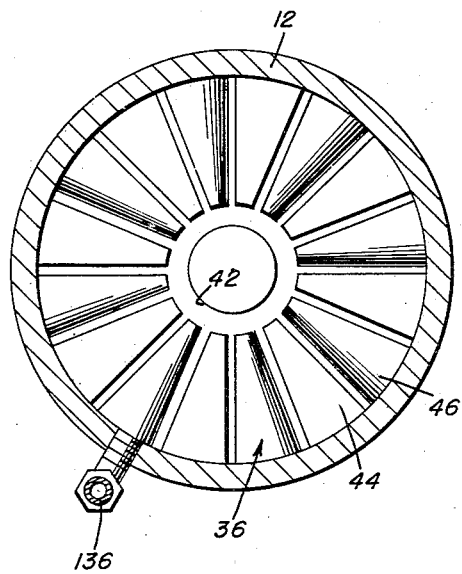
Fig. 6
Fig. 8
William H. Burke
INVENTOR.
BY *Clarence A. O'Brien*
*and Harvey B. Jackson*
Attorneys March 25, 1958  W. H. BURKE  2,827,802
FLUID DIFFERENTIAL Filed Jan. 3, 1956  3 Sheets-Sheet 2

William H. Burke
INVENTOR.

March 25, 1958  W. H. BURKE  2,827,802
FLUID DIFFERENTIAL

Filed Jan. 3, 1956  3 Sheets-Sheet 3

William H. Burke
INVENTOR.

BY [signatures]
Attorneys

United States Patent Office

2,827,802
Patented Mar. 25, 1958

2,827,802

FLUID DIFFERENTIAL

William H. Burke, Coleman, Mich., assignor of forty-nine percent to Frank J. Kalmar, Coleman, Mich.

Application January 3, 1956, Serial No. 556,832

3 Claims. (Cl. 74—710)

The present invention generally relates to a power transmission device and more specifically provides improved and novel construction in a fluid differential employing an airtight casing having a predetermined amount of pressure therein together with fluid for transmitting a driving power from an input shaft to a pair of output shafts disposed perpendicularly to the input shaft wherein the fluid differential may be effectively employed in an automotive vehicle and may be substituted for the conventional type of differential and rear end employed normally in an automotive vehicle.

An object of the present invention is to provide a fluid differential which is also employed as a reversing device whereby a suitable control mechanism is provided for directing flow of pressurized fluid for driving the axle output shafts in one of two rotational directions.

A further object of the present invention is to provide a fluid differential which reduces the percentage of the engine horsepower lost due to friction within the conventional type of differential and transmission thereby supplying more of the engine horsepower to the wheels for use.

Yet another important object of the present invention is to provide a fluid differential having extremely close tolerances whereby the various turbines and pumps are as near to being actual gear drives as possible but yet permit a slight degree of relative rotation whereby the differential will permit an automotive vehicle to proceed around a corner in the conventional manner of a differential but will still deliver an effective amount of the engine horsepower to the driving wheels without excessive loss due to friction which occurs in a gear drive.

Other objects of the present invention will reside in its rugged construction, extreme simplicity, adaptation for its various purposes, ease of controlling, efficiency in operation and relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of the fluid differential of the present invention;

Figure 6 is a transverse, vertical sectional view taken substantially upon a plane passing along section line 6—6 of Figure 1 illustrating the details of the axle turbines attached to the inner ends of the axle shafts;

Figure 8 is a perspective view of a pump turbine.

Figure 3:
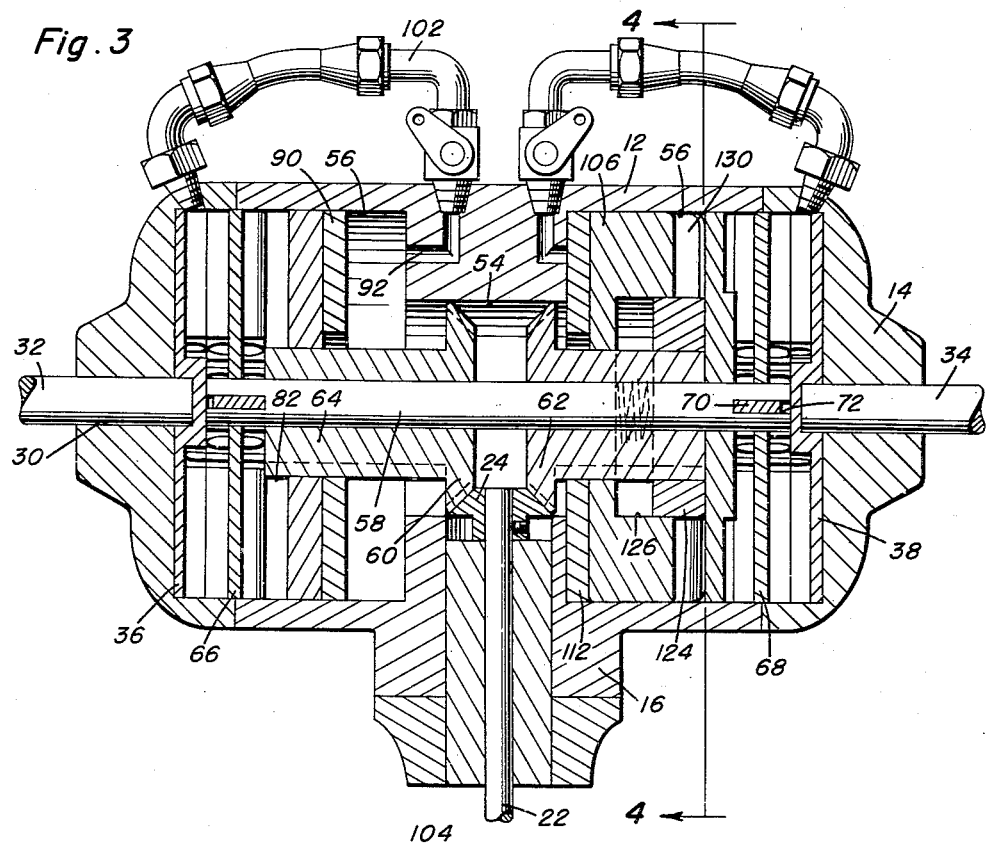
Figure 3 is a longitudinal, vertical sectional view taken substantially upon a plane passing along section line 3—3 of Figure 1 illustrating further structural details of the fluid differential.
Figure 4:
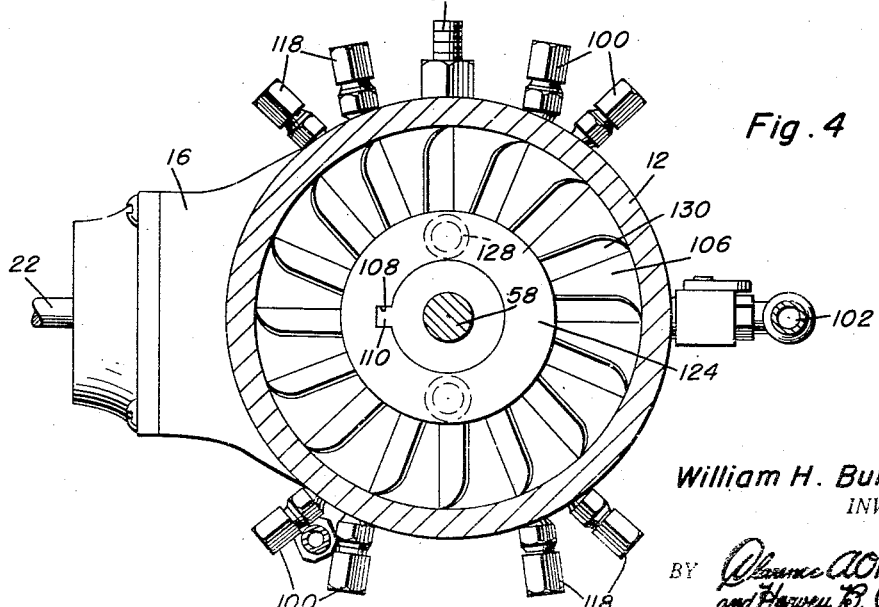
Figure 4 is a transverse, vertical sectional view taken substantially upon a plane passing along section line 4—4 of Figure 3 illustrating the variable vanes in the rotatable pump for actuating the fluid differential.

Referring now specifically to the drawings, the numeral 10 generally designates the fluid differential of the present invention which includes a substantially cylindrical casing 12 which is elongated and provided with a pair of removable end caps 14 which may be retained in position by any suitable screw-threaded fastening means. Projecting forwardly from the center of the casing 12 is a transversely disposed boss 16 having a cylindrical bore 18 extending therethrough and communicating with the interior of the casing 12. A bearing 20 is disposed in the bore 18 in the boss 16 for journaling a drive shaft 22 therein which is provided on the inner end thereof with a bevel gear 24 rigidly secured to the shaft 22 and detachable therefrom by the use of a set screw 26 or any other suitable securing means.

Each of the end plates 14 is provided with a boss 28 having a bore 30 therein for journaling outwardly extending axles 32 and 34, respectively, wherein the axles 32 and 34 represent the left and right-hand axles of an automotive vehicle wherein the present invention is defined in conjunction with an automotive vehicle but it will be understood that it may be employed in any desired manner for the transmission of power from a driving shaft 22 to a pair of driven shafts or axles 32 and 34.

Mounted on the inner end of each of the shafts or axles 32 and 34 which terminate within the end caps 14 is an axle turbine 36 and 38, respectively, on the shafts or axles 32 and 34. Each of the turbines 36 and 38 is provided with a smooth outer surface for positioning adjacent to the inner surface of the end caps 14 of the casing 12.

As illustrated in Figure 8 for purposes of convenience, the turbine is designated by the numeral 36 and includes a central opening 40 for receiving the shaft 40 and the turbine 36 is rigidly secured thereto by any suitable fastening means.

Figure 2:
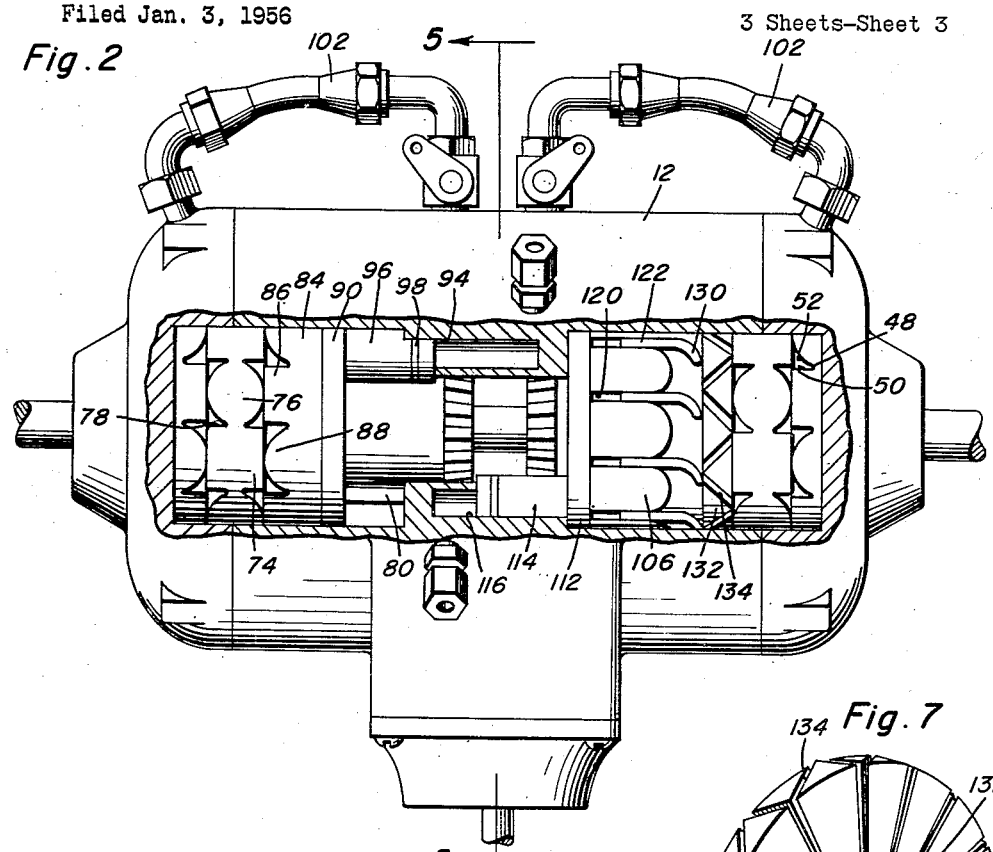
Figure 2 is a plan view of the fluid differential with a portion of the top thereof being broken away for illustrating the internal details of construction of the fluid differential.
Figure 5:
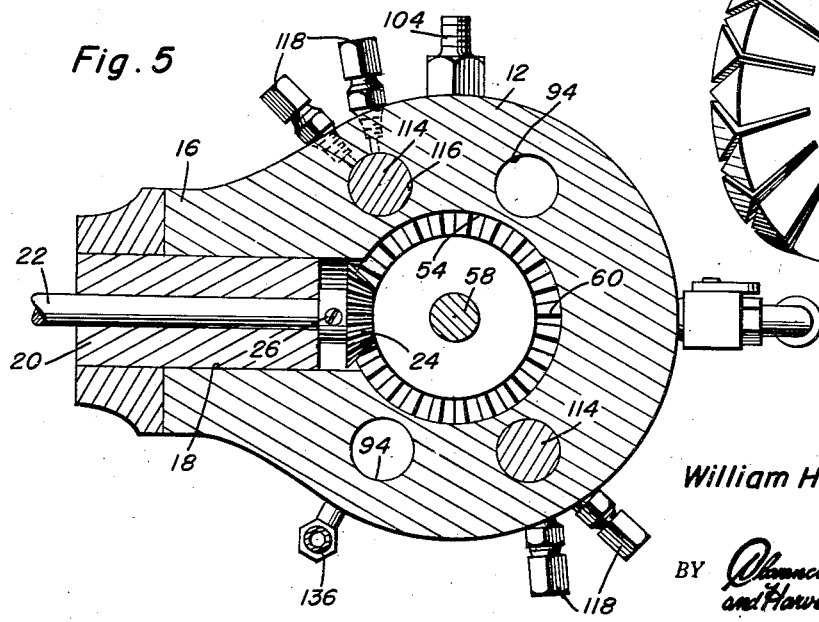
Figure 5 is a transverse, vertical sectional view taken substantially upon a plane passing along section line 5—5 of Figure 2 illustrating the drive pinion and the drive mechanism for the fluid pumps.
Figure 7:
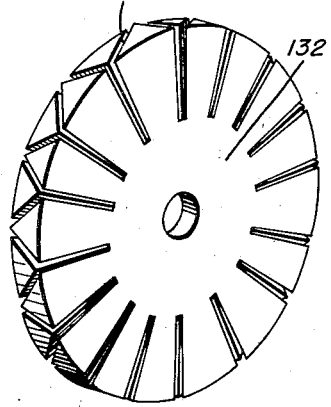
Figure 7 is a perspective view of a portion of the reversing turbine.

Extending radially from a recessed central hub 42 is a series of alternate radial ribs of generally rectangular cross-sectional area designated by the numeral 44 and the ribs of semi-cylindrical cross-sectional area designated by the numeral 46 wherein the semi-cylindrical ribs 46 form a juncture with the rectangular ribs 44 with radial grooves 48 wherein each of the radial grooves 48 includes a flat surface 50 and a rounded surface 52 substantially as illustrated in Figure 2 thereby forming radial ribs and grooves or vanes in the inner face of each of the axle turbines 36 and 38.

The casing 12 includes a central cylindrical bore 54 and an enlarged cylindrical bore 56 on each side thereof wherein the cylindrical bores 56 are equal in size to the bore of the caps 14 whereby the axle turbines 36 and 38 are substantially the same size as the cylindrical bores 56.

A longitudinally extending shaft 58 is mounted in the casing 12 in alignment with the axles 32 and 34 with the ends thereof being spaced from the ends of the axles 32 and 34. Disposed on the shaft 58 is a pair of bevel gears 60 and 62 which are in meshing engagement on opposite sides of the bevel gear 24 on the drive shaft 22 and the gears 60 and 62 are journaled on the shaft 58 for rotation thereon in opposite directions which is caused by the meshing engagement of the bevel gears 60 and 62 with the opposite sides of the drive gear 24.

Each of the gears 60 and 62 includes an elongated cylindrical hub portion 64 extending outwardly towards the end caps 14.

Rigidly secured to the outer ends of the shaft 58 are a pair of spool disk turbines 66 and 68 each of which includes a transverse key 70 extending through an end slot 72 in the end of the shaft 58 thereby detachably and rigidly securing the turbines 66 and 68 to the ends of the shaft 58 for rotation therewith. Each of the turbines 66 and 68 includes on the inner and outer faces thereof alternate rectangular ribs 74 and semi-cylindrical ribs 76 which are substantially identical to the ribs 44 and 46 on the turbines 36 and 38. These ribs 74 and 76 are provided with identically shaped juncture grooves 78 which are identical to the shape of the grooves 48 in the turbines 36 and 38 as illustrated in Figure 2. Inasmuch as the turbines 66 and 68 are rigidly secured to the shaft 58, the turbines 66 and 68 will rotate in the same direction at the same speed. As illustrated in Figure 2, the turbines 66 and 68 are in facing relation to the axle turbines 36 and 38 wherein rotation of the turbines 66 and 68 in either direction will rotate the axle turbines 36 and 38 in the same direction due to the close fitting between the turbines 66 and 68 and 36 and 38, respectively, wherein these turbines will act as a fluid drive connection whether they are turning in one direction or the other and will also permit limited relative movement between the axle turbines 36 and 38 to permit the vehicle to proceed around a corner in the usual manner.

The hub extension 64 on the gear 60 is provided with a longitudinal projecting key 80 which is slidable in a groove 82 in a driving turbine 84 thereby slidably mounting the turbine 84 on the hub extension 64 on the gear 60 whereby the turbine 84 will be rotated with the gear 60 but may be moved longitudinally on the hub extension 64 thereby moving the turbine 84 longitudinally of the casing 12. The turbine 84 is provided with alternate rectangular ribs 86 and semi-cylindrical ribs 88 as illustrated in Figure 2 which are substantially identical to the surfaces of the turbines 36, 38, 66 and 68. When the turbine 84 is moved to the position illustrated in Figure 2 wherein the outer surfaces of the ribs 86 and 88 are closely adjacent to the surfaces of the ribs 74 and 76 on the turbine 66, rotation of the turbine 84 will rotate the turbine 66 in the same direction thereby rotating the turbine 36 in the same direction and the axle 32 in the same direction. Since the shaft 58 is rigidly secured to the turbine 68, the turbine 68 will turn in the same direction as the turbine 66 thereby rotating the turbine 38 and the axle 34 in the same direction.

In order to move the turbine 84 longitudinally of the hub extension 64 an annular plate member 90 is provided which is in engagement with the inner smooth surface of the turbine 84 and acts as a movable piston for expansion and retraction and longitudinal movement in the cylindrical bore 56. The inner end of the cylindrical bore 56 has a fluid pressure passage 92 therein connected to suitable fluid lines whereby fluid pressure may be exerted against the annular plate member 90 or released therefrom for moving the turbine 84 longitudinally of the casing 12 whereby the axle shafts 32 and 34 may be rotated in one direction.

For extending the annular pressure plate 90 a pair of cylinders 94 are provided in diametrical opposition in the casing 12 for slidably receiving pistons 96 which are rigid with the pressure plate 90 and the pistons 96 are provided with seal rings 98 for sealing the pistons 96 within the cylinders 94. Fluid pressure fittings 100 are provided for inlet and exhaust of fluid pressure within the cylinders 94 for actuating the pressure plate 90. The passageway 92 is connected to a fluid conduit 102 that terminates within the cap 14 thereby equalizing the pressure within the cylindrical bore 56 and assuring proper movement of the pressure plate 90 and the turbine 84 without interference from pressure behind the plate 90. The entire internal area of the casing 12 is provided with fluid in the form of a liquid and an air inlet valve 104 is provided for pressurizing the the entire area of the casing 12 wherein the fluid conduit 102 equalizes the pressure in certain areas of the casing 12.

In order to drive the axles 32 and 34 in the other direction, the axle extension 64 on the gear 62 slidably receives a pump plate 106 having a groove 108 thereon slidably receiving a longitudinal lug 110 on the extension 64 of the gear 62 thereby rotatably and slidably supporting the pump 106 on the gear 62. An annular pressure plate 112 is provided in sliding relation to the bore 56 and against the inner smooth surface of the pump 106. The pressure plate 112 is provided with diametrically opposed pistons 114 slidable in cylinders 116 to which are connected fluid pressure fittings 118 for admitting and exhausting fluid pressure into the cylinders 116 for expanding the pistons 114 thereby expanding the pressure plate 112 into contact with the pump 106 for moving the pump 106 longitudinally of the casing 12.

The pump 106 is provided with a plurality of longitudinal slots 120 therein slidably supporting a plurality of radial vanes 122 mounted on a central hub 124 that is slidably received within a recess 126 in the center of the pump 106. A pair of diametrically opposed compression coil springs 128 are disposed between the hub 124 and the inner surface or bottom of the recess 126 continuously urging the hub 124 outwardly of the pump 106 and thereby urging the vanes or blades 122 outwardly of the slots 120 in the pump 106. The vanes or blades 122 are provided on their outer edges with curved terminal edges 130 which have their edges in abutting engagement with a reversing annular plate member 132 that is provided with a plurality of slots 134 therein with the slots being disposed in substantially perpendicular relation to each other with one set of slots being angulated in one direction and the other set of slots being angulated in another direction substantially 90° in relation to each other whereby fluid pumped by the blades 122 will go through one set of slots 134 during one direction of rotation and will cause the fluid to go into the other set of slots in the other direction of rotation for directing the fluid into the grooves 78 on the turbine 68 for increasing the efficiency thereof. When the blades 130 are pumping fluid through the plate 132 into contact with the turbine 68, the turbine 38 ad the shaft 58 is rotated in a direction opposite to the direction of rotation when the turbine 84 is used as a drive turbine. When the turbine 84 is used as a drive turbine, the axles 32 and 34 are rotated in a direction for moving a vehicle in a reverse manner. When the pump or turbine 106 is employed for driving, the axles 32 and 34 will be rotated in a forward direction whereby the degree of movement of the pistons 114, the pressure plate 112 and the pump 106 will determine the fluid pressure exerted on the turbine 68 thereby varying the speed and power of the output shafts 32 and 34. The fluid coupling between turbines 36 and 66 and 38 and 68 permits a differential action between axles 32 and 34.

An interconnecting line 136 interconnects the end caps 14 while the interconnecting lines 102 equalize the pressures in the individual cylindrical bores 56 thereby retaining the fluid and air pressure equal throughout the entire inner area of the casing 12. It would be necessary to only have a source of fluid pressure whereby a selective control valve may be employed for expanding either the pistons 96 or 114 thereby moving either the pressure plates 90 or 112 for movement of the vehicle in a reverse or forward direction. Depending upon the scope of movement of the pistons 114, the forward speed of the vehicle may be easily determined, adjusted and controlled thereby completely eliminating the transmission of a vehicle whereby the drive shaft 22 may be driven directly from the internal combustion engine of the vehicle.

It will be understood that all tolerances and spacings between the various turbines and their related structures such as the walls of the casing and the end caps are extremely close thereby eliminating losses of liquid pressure but the spacings are sufficient to reduce frictional drag to an absolute minimum thereby eliminating a great loss of engine horsepower and permitting a greater percentage of the engine horsepower to be actually transmitted to the rear driving wheels for moving the vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A fluid differential for use in an automotive vehicle comprising an elongated cylindrical casing having an input shaft extending transversely into the casing of the center thereof, and an output shaft extending longitudinally from each end of said casing, said output shafts being in the form of axles and the input shaft being in the form of a drive shaft, said shafts being journaled in said casing, an axle turbine on the inner end of each axle, a shaft disposed longitudinally in said casing, a spool turbine disposed on each end of said longitudinal shaft for driving said axle turbines, and means for driving said spool turbines selectively in opposite directions.

2. A fluid differential for use in an automotive vehicle comprising an elongated cylindrical casing having an input shaft extending transversely into the casing of the center thereof, and an output shaft extending longitudinally from each end of said casing, said output shafts being in the form of axles and the input shaft being in the form of a drive shaft, said shafts being journaled in said casing, an axle turbine on the inner end of each axle, a shaft disposed longitudinally in said casing, a spool turbine disposed on each end of said longitudinal shaft for driving said axle turbines, and means for driving said spool turbines selectively in opposite directions, said means for driving the spool turbines in opposite directions including a bevel gear on the inner end of said input shaft, a pair of bevel gears rotatable on said longitudinal shaft and in meshing engagement with diametrically opposed points of the bevel gear on the input shaft whereby the pair of gears on the longitudinal shaft rotate in opposite directions.

3. The combination of claim 2 wherein each of the pair of bevel gears on the shaft is provided with a drive pump turbine rotatable therewith, said pump turbines being longitudinally shiftable in relation to one of the spool turbines, means for shifting said pump turbines in relation to the respective spool turbines, and a reversing plate interposed between one pump turbine and one spool turbine for reversing the direction of fluid flow from the pump turbine to the spool turbine for driving the spool turbine in reverse direction.

References Cited in the file of this patent

UNITED STATES PATENTS 2,414,396     Landrum _____ Feb. 25, 1947